United States Patent
Danne et al.

(10) Patent No.: US 8,086,709 B2
(45) Date of Patent: Dec. 27, 2011

(54) METHOD AND APPARATUS FOR DISTRIBUTING LOAD ON APPLICATION SERVERS

(75) Inventors: Anders Olof Danne, Kista (SE); Michael Palmeter, Millbrae, CA (US)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 857 days.

(21) Appl. No.: 11/908,402

(22) PCT Filed: Mar. 22, 2006

(86) PCT No.: PCT/SE2006/000356
§ 371 (c)(1),
(2), (4) Date: May 16, 2008

(87) PCT Pub. No.: WO2006/107249
PCT Pub. Date: Oct. 12, 2006

(65) Prior Publication Data
US 2008/0280623 A1    Nov. 13, 2008

(30) Foreign Application Priority Data

Apr. 4, 2005 (SE) ...................................... 0500732

(51) Int. Cl.
*G06F 15/173* (2006.01)
(52) U.S. Cl. ......... 709/223; 709/238; 709/219; 455/453
(58) Field of Classification Search .......... 709/223–224, 709/238, 217–219, 203; 455/453
See application file for complete search history.

(56) References Cited

U.S. PATENT DOCUMENTS 6,128,279 A * 10/2000 O'Neil et al. ................. 709/223
(Continued)

FOREIGN PATENT DOCUMENTS

WO          03/069473 A1     8/2003
(Continued)

OTHER PUBLICATIONS

Magedanz, T. et al.: "The IMS Playground @ Fokus—An Open Testbed for Next Generation Network Multimedia Services" Testbeds and Research Infrastructures for the Development of Networks and Communities, 2005. Tridentcom 2004. First International Conference on Trento, Italy Feb. 23-25, 2005. Piscataway, NJ, USA, IEEE, Feb. 23, 2005, pp. 2-11, XP010774253. ISBN: 0-7695-2219-X.

(Continued)

*Primary Examiner* — Philip B Tran
(74) *Attorney, Agent, or Firm* — Potomac Patent Group PLLC (57) ABSTRACT

A method and apparatus for handling incoming service requests, where an application server comprises a set of traffic modules, each being capable of handling at least one predetermined multimedia service. When an initial service request is received from a requester, a load balancing function, capable of selecting basically any traffic module in the set of traffic modules, is applied to assign a traffic module in the set of traffic modules for handling the received service request. After processing the request, a response is sent to the requester including a port number associated with the assigned traffic module. When receiving a subsequent service request including a port number indication, a port mapping function is applied to determine the earlier-assigned traffic module associated with the given port number indication, for handling said subsequent service request.

20 Claims, 4 Drawing Sheets

U.S. PATENT DOCUMENTS

| | | | |
|---|---|---|---|
| 6,888,828 B1 * | 5/2005 | Partanen et al. | 370/389 |
| 7,328,237 B1 * | 2/2008 | Thubert et al. | 709/203 |
| 7,372,813 B1 * | 5/2008 | Cimino et al. | 370/235 |
| 7,584,262 B1 * | 9/2009 | Wang et al. | 709/217 |
| 7,636,917 B2 * | 12/2009 | Darling et al. | 709/223 |
| 7,805,517 B2 * | 9/2010 | Shim et al. | 709/227 |
| 2003/0016624 A1 * | 1/2003 | Bare | 370/217 |
| 2003/0074467 A1 | 4/2003 | Oblak et al. | |
| 2004/0152469 A1 * | 8/2004 | Yla-Outinen et al. | 455/453 |
| 2005/0071455 A1 | 3/2005 | Collins | |
| 2005/0080890 A1 * | 4/2005 | Yang et al. | 709/223 |
| 2006/0271655 A1 * | 11/2006 | Yoon et al. | 709/223 |

FOREIGN PATENT DOCUMENTS

| | | |
|---|---|---|
| WO | 03/069474 A1 | 8/2003 |

OTHER PUBLICATIONS

Hong, J. et al.: "Hierarchical cluster for scalable web servers" Proceedings. IEEE International Conference on Cluster Computing Cluster, Oct. 8, 2001, pp. 1-4, XP002958431.

PCT International Search Report, mailed Jun. 20, 2006, in connection with International Application No. PCT/SE2006/000356.

PCT Written Opinion, mailed Jun. 20, 2006, in connection with International Application No. PCT/SE2006/000356.

PCT International Preliminary Report on Patentability, completed Apr. 11, 2007, in connection with International Application No. PCT/SE2006/000356.

First Chinese Office Action, dated May 27, 2010, in connection with Chinese Patent Application No. 200680011186.4.

* cited by examiner

METHOD AND APPARATUS FOR DISTRIBUTING LOAD ON APPLICATION SERVERS

CROSS-REFERENCE TO RELATED APPLICATIONS

This application claims priority under 35 U.S.C. §119 to Swedish Patent Application No. 0500732-3, filed Apr. 4, 2005, which is hereby incorporated herein by reference in its entirety.

TECHNICAL FIELD

The present invention relates generally to a method and apparatus for distributing data and processing load between a plurality of equal traffic modules in an application server.

BACKGROUND

With the emergence of 3G mobile telephony, new communication technologies have been developed providing greater network capacity and higher transmission rates. For example, GPRS (General Packet Radio Service) and WCDMA (Wideband Code Division Multiple Access) technologies are used to support wireless multimedia telephony services requiring a wide range of data rates and different protocols. The trend today is also a move towards packet-switched transport, providing greater flexibility and utilization of available communication resources.

Further, new sophisticated terminals are rapidly emerging on the user market, having high resolution colour displays and various codecs (coders/decoders) for communicating audio and visual information in different formats. The multimedia services may involve communication of data representing voice, images, text, documents, animations, audio files, video files, etc. in a multitude of different formats and combinations.

A prevailing goal or ambition in the field of telecommunication is to converge all services on to a single packet-based transport mechanism: the Internet Protocol (IP), regardless of the type of services, access networks and technologies. Therefore, a service network architecture called "IP Multimedia Subsystem" (IMS) has recently been developed by the $3^{rd}$ Generation Partnership Project (3GPP) as an open standard, to give operators of access networks the ability to offer multimedia services in the packet domain.

Basically, an IMS service network comprising various different network elements can be integrated with any type of access network and is independent of the access technology used, provided that the access network can meet the service requirements in terms of bandwidth, QoS (Quality of Service), etc. Hence, IMS is a platform for enabling services based on IP transport, basically not restricted to any limited set of specific services.

A communication protocol called SIP (Session Initiation Protocol) has been defined by IETF (Internet Engineering Task Force) as a generic session management protocol for handling a wide range of IP-based services. SIP is a signalling protocol for creating, modifying and terminating communication sessions with one or more participants. SIP is also an application-layer protocol running on top of several different transport protocols. Either UDP (User Datagram Protocol), TCP (Transport Control Protocol) or SCTP (Stream Control Transmission Protocol) can be used as a transport mechanism for SIP messages. When sending SIP messages, an addressing element called "SIP URI" (Uniform Resource Identifier) is used to indicate the source and destination, respectively, of the communicated SIP messages.

Figure 1:
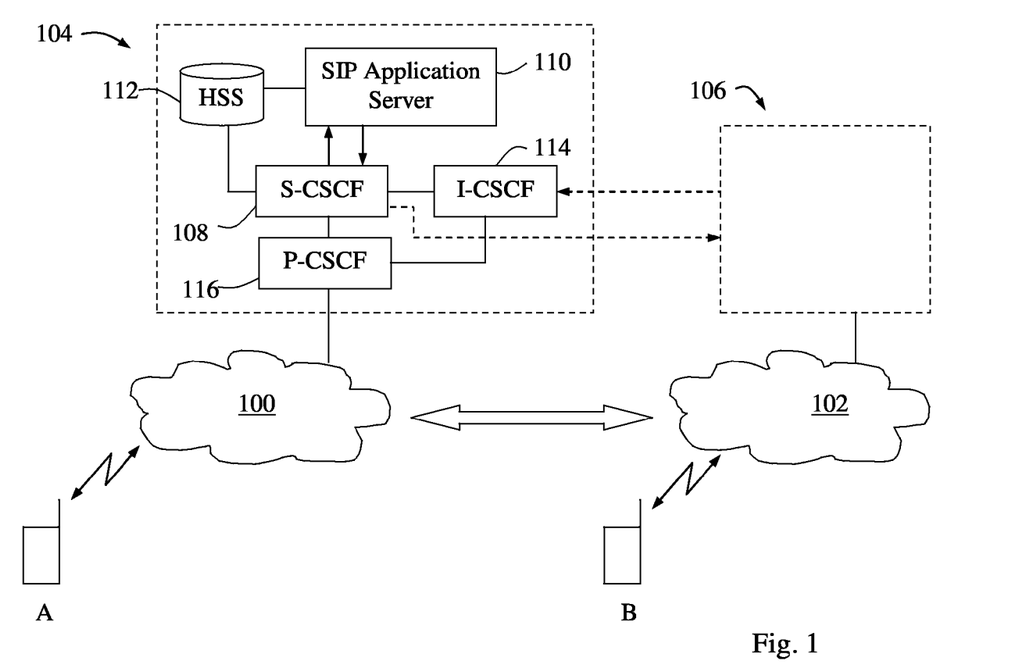
FIG. 1 is a schematic overview of a basic communication scenario in which the present invention can be used.

FIG. 1 generally illustrates a basic network structure for providing multimedia services by means of an IMS service network. It should be noted that the figure is greatly simplified and shows only a selection of network nodes needed to understand the context of the present invention. A calling mobile terminal A is connected to a first radio access network 100 and communicates with a called mobile terminal B connected to a second radio access network 102, in a communication session S involving one or more multimedia services. Alternatively, terminal A may communicate with a fixed terminal or computer or a content server delivering some multimedia content to the terminal, such as a piece of music, a film or a game.

An IMS network 104 is connected to the first radio access network 100 and handles the session with respect to terminal A, as initiated by its user. In fact, the IMS network 104 receives and processes any service requests made by the user of terminal A. In this example, a corresponding IMS network 106 handles the session on behalf of terminal B, and the two IMS networks 104 and 106 are controlled by different operators. Similarly, the IMS network 106 receives and processes any service requests made by the user of terminal B. In the following description, the IMS network 104 of the calling party terminal A will be considered, although the described functions and procedures may also work in IMS network 106 just as well. Alternatively, terminals A and B may of course be connected to the same access network and/or belong to the same IMS home network.

In general, multimedia services are always handled by the home IMS network of the subscriber, and in the shown scenario, terminals A and B are connected to their respective home IMS networks. On the other hand, if both terminals A and B belong to the same home network, only one IMS network would handle all service requests from terminals A and B.

The illustrated session S is managed, using SIP signalling, by a node called S-CSCF (Serving Call Session Control Function) 108 assigned to terminal A in the IMS network 104, and the used multimedia service is enabled and executed by a SIP application server 110. Basically, the S-CSCF node 108 serves as a proxy for the SIP application server 110 towards terminal A and sends SIP messages from terminal A to the IMS network 106 of terminal B, as indicated by a dashed arrow. Further, a main database element HSS (Home Subscriber Server) 112 stores subscriber and authentication data as well as service information, among other things, that the SIP application server 110 can fetch for executing services for subscribers. The S-CSCF node 108 may also fetch information from the HSS 112 to determine which application server 110 to handle a service requested by terminal A, as determined by "triggers" in the HSS 112.

A node called I-CSCF (Interrogating Call Session Control Function) 114 is connected to other IMS networks, in this case network 106, and acts as a gateway for SIP messages from other IMS networks. I-CSCF 114 receives SIP messages from the IMS network 106 of terminal B, as indicated by another dashed arrow. Another node called P-CSCF (Proxy Call Session Control Function) 116 acts as an entry point towards the IMS network 104 from any access network, such as network 100, and all signalling flows between users and the IMS network 104 are routed through the P-CSCF 116. The various functions of the I-CSCF and P-CSCF nodes 114, 116 are not necessary to describe here further to understand the context of the present invention. Of course, the IMS network 104 contains numerous other nodes and functions, such as further S-CSCF nodes and SIP application servers, which are not shown here for the sake of simplicity. Basically, the IMS network 106 comprises the same type of nodes as network 104.

The shown SIP application server 110 may be configured to provide one or more specific multimedia services to subscribers. The workload on certain SIP application servers can be substantial and may increase rapidly so that individual servers becomes overloaded, at least during limited time periods. SIP application servers are therefore often built as clusters with a plurality of similar server units, hereafter referred to as "traffic modules", each being capable of basically performing the functions required from the application server. To overcome temporary overloading problems in application servers, further traffic modules can be added in an application server to meet a higher load. Thus, a particular application server typically comprises a plurality of such traffic modules and a "load sharing" function for distributing the work load among the traffic modules. In this way, a scalable server with a cluster of traffic modules is provided, which is transparent so that only a single "virtual" server is seen. Scalability is thus achieved by adding or removing traffic modules in the cluster.

Figure 2:
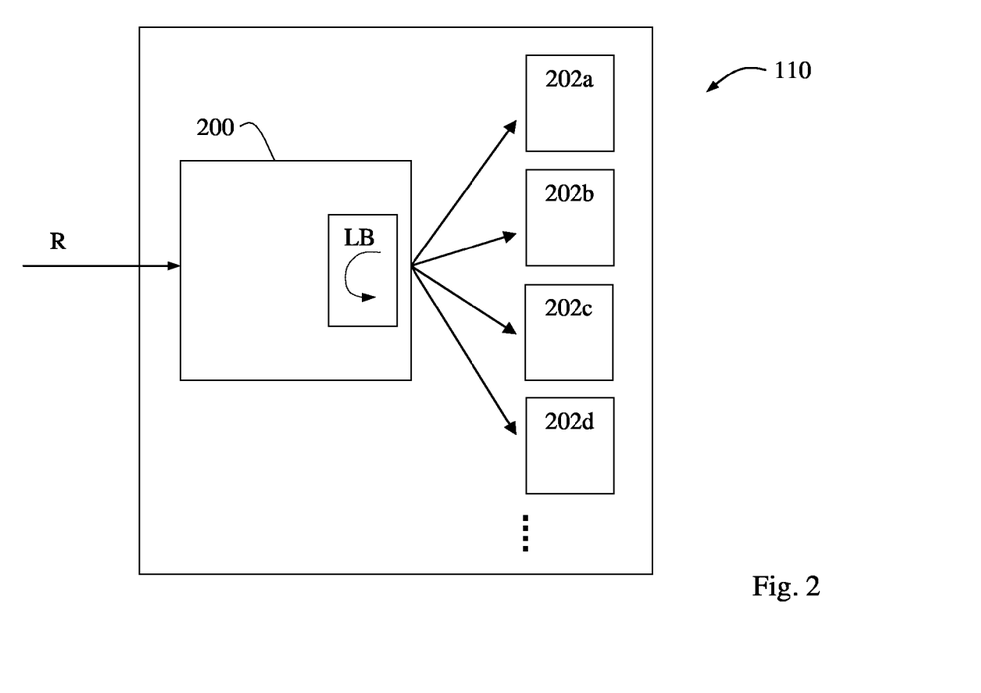
FIG. 2 is a block diagram of an application server cluster according to the prior art.

FIG. 2 illustrates schematically the SIP application server 110 of FIG. 1 in more detail, adapted to handle service requests from subscribers. The front-end of the server 110 is a receiving unit 200 having a load balancing function LB, configured to schedule incoming service requests R to different traffic modules 202a, 202b, 202c, 202d . . . . Each one of the traffic modules is capable of processing requests according to the service(s) implemented in the server 110. The scheduling of incoming service requests to different traffic modules can be made in different ways. Basically, any of the traffic modules can either be selected, e.g. randomly or according to a "Round Robin" schedule or the like, or the same traffic module can be selected repeatedly for a specific user by using a hashing algorithm always providing the same result, e.g. by using a constant value associated with the user or session as input to the algorithm.

In WO 03/069473 and WO 03/069474, some solutions for load sharing and data distribution in servers using load balancing functions are described. In these known solutions, a user identity is used as input to a hashing algorithm to provide the same server for different requests from a specific user.

When a SIP application server activates a service for a subscriber, a created session identity, "call ID", is used as a reference to the ongoing session. Further, various session specifics are also determined, such as subscriber data, service parameters, codecs (coders/decoders), protocols, multiplexing schemes, etc., which are used during the session. Necessary session data/information is therefore fetched from the HSS 112, and some may also be read in communicated SIP messages. This data is then temporarily stored in the application server throughout the session.

If the application server contains a cluster of traffic modules, the session information can either be stored in a common database in the server, available to all traffic modules, or locally in a specific traffic module assigned for the session. In the former case, any traffic module can handle an ongoing session by fetching necessary session information from the common database, which is however considered to be a relatively complex situation resulting in increased latency. In the latter case, any subsequent requests requiring the stored session information must be directed to that particular traffic module, sometimes referred to as session "affinity" or "stickiness". In the case of HTTP-based messages, the load balancing function is normally responsible for always selecting the same traffic module during a session. The load balancing function may then use a suitable hashing algorithm, as described above, using a session specific value as input to provide the same traffic module.

When SIP-based "Voice-over-IP" services are executed, it is possible to use an application-layer load balancing function known as a "stateless load balancing SIP proxy", one example of which is an implementation called the "Vovida Load Balancer". The Vovida Load Balancer distributes incoming requests to different identical servers, such that all users can direct their requests to the same SIP URI address, and the Load Balancer will assign servers dynamically to handle each request. Each request is forwarded to the next available server that appears on a predetermined list of associated servers, i.e. according to a "Round Robin" schedule. The Load Balancer then receives responses and then forwards them back to the requesting party.

The Vovida Load Balancer adds its own SIP URI address in a "Via" address field in the header of an incoming SIP request packet, before transferring the packet to the assigned server, in order to receive a subsequent response from the server which is then forwarded to the requesting party. In the case of TCP-based transport, a "sliding window" mechanism is used for reliably streaming application data between IP endpoints. At the TCP layer, the endpoints are not aware of any delimiters in the data stream, essentially meaning that SIP messages are not distinguished. The Vovida Load Balancer thus works at the application level, receiving the TCP stream and handling the SIP messages as such.

"Stickiness" may thus be obtained by applying a hashing algorithm using a value derived from the "CallID", "To", "From" tags, as an input value to the algorithm. This value is called the "Dialog Identifier". However, it is a problem that a hashing algorithm must be applied each time in order to reach the same traffic module, since significant processing resources are consumed in the process. Such a solution requires that the cluster front-end stores data (as a hash table) related to a transaction between requests.

However, since the Vovida Load Balancer does not store data between transactions, it cannot even ensure that requests within a SIP dialog are consistently directed toward the same traffic module. Therefore, all traffic modules must use a shared database or the like for storing the state of any given SIP dialog. As the cluster front end handles SIP traffic in this way, substantial added complexity is introduced that may lead to software failure and added maintenance costs for the software product over time.

Thus, using hashing algorithms and/or common databases will generally not provide a satisfactory solution for obtaining load balancing and session affinity in this context, as explained above.

US 2003/0074467 A1 discloses a plurality of recipient servers 308a-d in communication with a load balancer 304, where each recipient server is associated with different unique service port numbers assigned to that recipient server, and common redirect port numbers assigned to a group of recipient servers. The first data packet transmitted by a client server 302 includes a destination port number, and is first received at the load balancer. If the destination port number matches one of the unique service port numbers, the load balancer sends the data packet to the corresponding recipient server. If the destination port number matches one of the common redirect port numbers, the load balancer selects a recipient server in the corresponding recipient server group and sends the data packet thereto.

The selected recipient server then sends a response to the client server including a redirect flag set to a service port number, associated with that recipient server, to which the client server must send subsequent data packets. In the solution presented in US 2003/0074467 A1, the recipient server is thus initially identified and selected depending on the destination port number given in the first received data packet.

SUMMARY

One object of the present invention is to address the problems outlined above and to provide efficient distribution of processing and storing load for incoming multimedia service requests. It is also an object to generally decrease latency and complexity when assigning a traffic module in a scalable application server cluster, and to make the assigning process for each service request simple and yet reliable.

These objects and others can be obtained by providing a method and apparatus, respectively, according to the attached independent claims. According to one aspect, a method is provided for handling incoming service requests in an application server comprising a set of equal traffic modules, each being capable of handling requests for one or more multimedia services implemented in the application server. In the inventive method, it is determined whether a received service request is an initial service request or a subsequent service request following a previous service request in the same session.

In the case of an initial service request, a load balancing function capable of selecting basically any traffic module in the set of traffic modules, is applied to assign a traffic module for processing the received service request. Then, a response to the initial service request is sent that includes a port number associated with the selected and assigned traffic module.

In the case of a subsequent service request, a port mapping function is applied to determine a specific traffic module in the set of traffic modules associated with a port number given in the received subsequent service request, for processing the received service request. The port number in the received subsequent service request has been given to the requester in an earlier response to a previous service request.

The inventive method may be implemented in an application server that belongs to an IMS service network, and the service requests are then typically communicated according to the SIP protocol. In that case, the port number of the assigned traffic module is preferably provided by adding it to the address of the application server in one of the following existing SIP headers: "record-route", "via", "route" and "contact".

Incoming service requests may typically be received on different input ports at the application server. The application server may then preferably apply either the load balancing function or the port mapping function, based on which port number a request is received on at the application server. In one embodiment, the application server applies the load balancing function when initial requests are received on at least one predetermined port number at the application server. For example, initial requests according to a first traffic case of originating requests may be received on a first predetermined port number, initial requests according to a second traffic case of terminating requests may be received on a second predetermined port number, and initial requests according to a third traffic case of terminating requests/unregistered may be received on a third predetermined port number. Furthermore, the application server may apply the port mapping function when subsequent requests according to a fourth traffic case are received on a fourth predetermined port number or higher.

In another embodiment, incoming service requests may be provided on different input ports at the assigned traffic module, based on which port numbers the application server receives the requests on, to discern different traffic cases. For example, initial requests, received on the first predetermined port number at the application server, may be provided on a first input port at the assigned traffic module; initial requests, received on the second predetermined port number at the application server, may be provided on a second input port at the assigned traffic module; initial requests, received on the third predetermined port number at the application server, may be provided on a third input port at the assigned traffic module; and subsequent requests, received on the fourth predetermined port number or higher at the application server, may be provided on a fourth input port at the assigned traffic module.

According to another aspect, an application server is provided for handling incoming service requests, comprising a set of equal traffic modules each being capable of handling requests for one or more multimedia services implemented in the application server. The application server further comprises means for determining whether a received service request is an initial service request or a subsequent service request in a session following a previous service request in the same session.

The inventive application server further comprises a load balancing unit adapted to apply a load balancing function capable of selecting basically any traffic module in the set of traffic modules to assign a traffic module for processing a received initial service request. The application server further comprises means for sending a response to the initial service request that includes a port number associated with the assigned traffic module. The application server also comprises a port mapping unit adapted to apply a port mapping function to determine a specific traffic module in the set of traffic modules associated with the port number given in a received subsequent service request, for processing the received service request.

The application server may belong to an IMS service network, and the service requests are then typically communicated according to the SIP protocol. In that case, the sending means is preferably adapted to provide the port number of the assigned traffic module by adding it to the address of the application server in one of the following existing SIP headers: "record-route", "via", "route" and "contact".

The application server may be adapted to receive incoming service requests on different input ports. In that case, the application server may be further adapted to apply either the load balancing function or the port mapping function, based on which port number a request is received on. In one embodiment, the application server is adapted to apply the load balancing function when initial requests are received on at least one predetermined port number. For example, the application server may be adapted to receive initial requests according to a first traffic case of originating requests on a first predetermined port number, to receive initial requests according to a second traffic case of terminating requests on a second predetermined port number, and to receive initial requests according to a third traffic case of terminating requests/unregistered on a third predetermined port number. The application server may then also be adapted to apply the port mapping function when subsequent requests according to a fourth traffic case are received on a fourth predetermined port number or higher.

In another embodiment, the application server may be adapted to provide incoming service requests on different input ports at the assigned traffic module, based on which port numbers the requests are received on, to discern different traffic cases. For example, the application server may be adapted to provide initial requests, received on the first predetermined port number, on a first input port at the assigned traffic module; to provide initial requests, received on the second predetermined port number, on a second input port at the assigned traffic module; to provide initial requests, received on the third predetermined port number, on a third input port at the assigned traffic module; and to provide subsequent requests, received on the fourth predetermined port number or higher, on a fourth input port at the assigned traffic module.

Further features and benefits of the present invention will be apparent from the detailed description below.

BRIEF DESCRIPTION OF THE DRAWINGS

The present invention will now be described in more detail and with reference to the accompanying drawings, in which.

DESCRIPTION OF PREFERRED EMBODIMENTS

Figure 3:
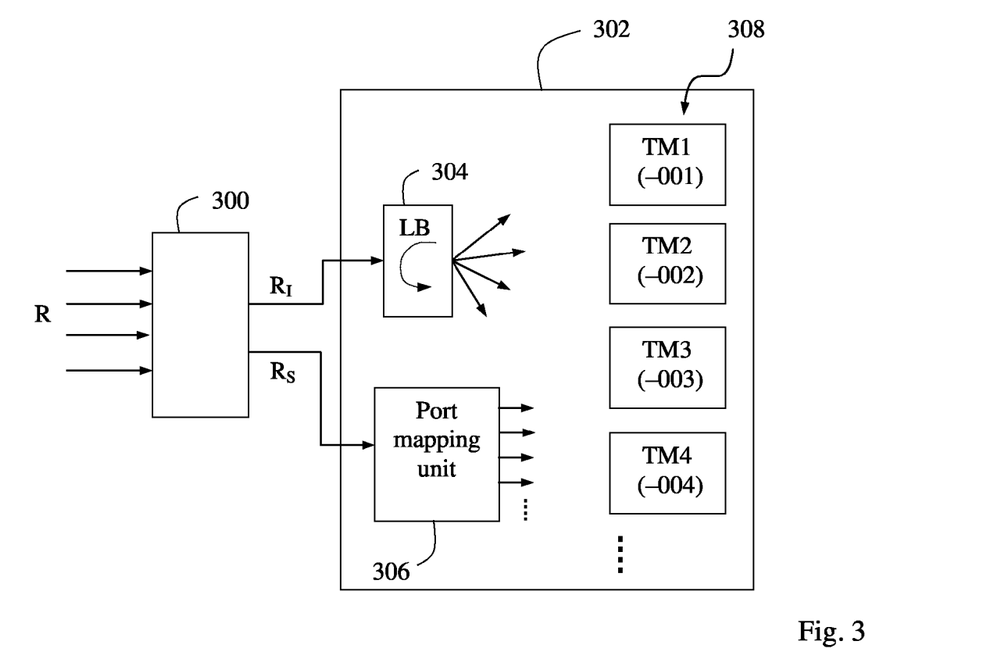
FIG. 3 is a block diagram partially illustrating a multimedia service network including an application server for handling incoming service requests, in accordance with the present solution.

To begin with, the present solution will now be briefly described with reference to FIG. 3, partially illustrating a multimedia service network where an S-CSCF node 300 is connected to an application server 302 configured to execute one or more predetermined multimedia services. The S-CSCF node 300 may be connected to several such application servers configured for different multimedia services. In this example, both nodes 300, 302 are included in an IMS service network, as described above in connection with FIG. 1, although the following description of preferred embodiments of the invention is basically not limited to the IMS concept. Incoming service requests R from subscribers are first received in the S-CSCF node 300 and are then forwarded to the application server 302. The S-CSCF node 300 is adapted to forward incoming requests to specific TCP or UDP ports in the application server 302, according to the following description.

The application server 302 comprises a load balancing function unit 304, a port mapping unit 306 and a set of equal traffic modules 308, indicated as TM1, TM2, TM3, TM4 . . . , each being capable of handling requests for one or more multimedia services implemented in the application server. Here, the term "equal traffic modules" implies that each traffic module has basically the same ability for processing service requests and executing services, although the traffic modules do not necessarily have exactly the same configuration in other respects. Thus, an incoming service request can basically be processed by any of the traffic modules in the set. As explained above, it is desirable to distribute the processing load evenly over the traffic modules, but also to provide a simple yet reliable mechanism for all requests in a particular session to be handled by the same traffic module.

An incoming request is either "initial" or "subsequent", i.e. a first request or a further request after the first one in a particular session. A session may thus be started by sending an initial request to the application server to invoke one or more services therein. According to the present solution, all initial requests $R_I$ are forwarded to the load balancing unit 304, and all subsequent requests $R_S$ are forwarded to the port mapping unit 306. The load balancing unit 304 is adapted to assign any of the traffic modules 308 for handling an incoming initial request, and the port mapping unit 306 is adapted to assign a specific traffic module 308 for handling an incoming subsequent request. The load balancing function may be based on, e.g., a Round Robin schedule or random selection, and the present invention is not limited in this respect.

After receiving an initial request, the assigned traffic module will typically send some kind of response back to the requesting subscriber or party, hereafter called "requester". Conventionally, all service requests are directed to the network address of the corresponding application server, e.g. (sip:userA@as1.operatorX.net). The present solution, however, provides a way of informing the requester on the identity of the assigned traffic module, such that any subsequent requests within the session can be addressed directly to the assigned traffic module.

At the input side of the application server 302, and also the S-CSCF node 300, specific input ports are provided, each having a specific port number or identity, on which requests are received. In the port mapping unit 306, each traffic module is associated with a specific port number corresponding to an internal private network address of the traffic module indicated in the figure as (–001) for TM1, (–002) for TM2, and so forth. After receiving and processing an initial request, the port number associated with the assigned traffic module is given in the response back to the requester.

In a preferred embodiment using SIP signalling, the assigned traffic module can provide its port number in the response by adding it to the address of the application server in any of the existing so-called "record-route", "via", "route" and "contact" headers that conventionally occur in such responses to service requests. Thereby, existing SIP headers can be easily utilised for conveying the port number information back to the requester.

If the requester later makes a subsequent request during the same session, the received port number of the assigned traffic module will be added to the destination address when sending the subsequent request, e.g. (sip: userA@as1.operatorX.net: 4004), in order to reach the same traffic module again, 4004 being the added port number. Receiving the subsequent request on the indicated port at the S-CSCF node 300 means that this is indeed a subsequent request directed to the traffic module associated with the given port number. As a result, the S-CSCF node 300 will forward the request on the indicated TCP/UDP port at the application server 302 leading to the port mapping unit 306. The port mapping unit 306 then maps the port number to the internal private network address of the corresponding traffic module, e.g. port number 4004 may map to traffic module TM1 (–001), and transfers the request thereto.

Figure 4:
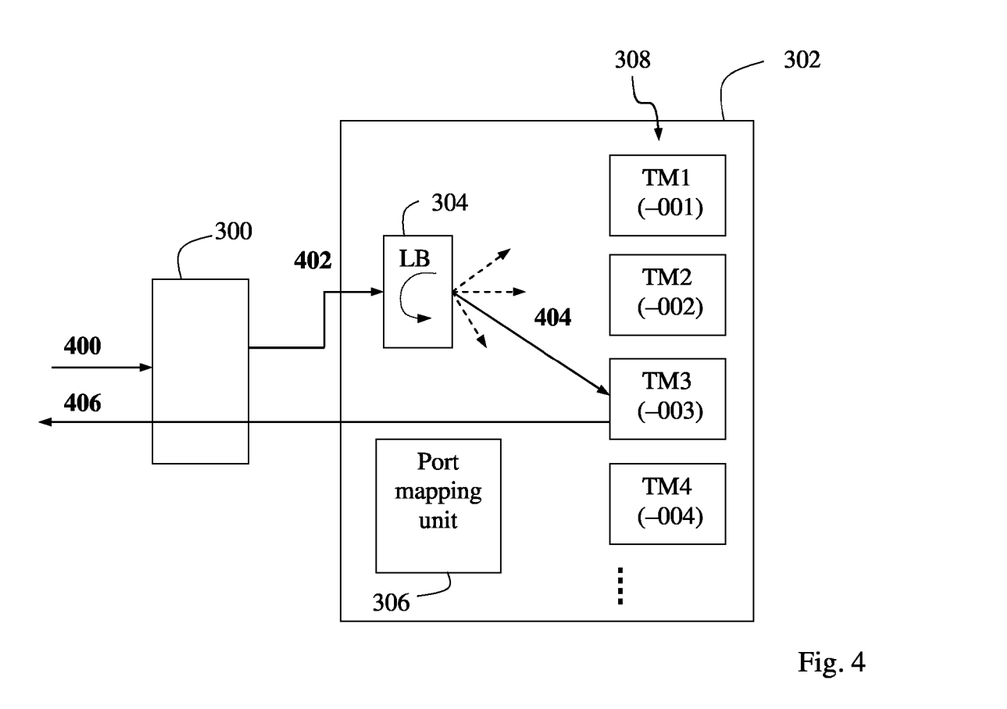
FIG. 4 is a block diagram of the application server in FIG. 3, when receiving an initial service request.

FIG. 4 illustrates a traffic case example when a requester (not shown) makes a first service request for a forthcoming multimedia session, which may be a SIP INVITE or a SIP SUBSCRIBE message in the context of IMS. In a first step 400, the request is received by the S-CSCF node 300. If no port number associated with any specific traffic module is included in the destination address field of the request, the request is an initial request which is therefore transferred to the load balancing unit 304 in the application server 302, in a step 402.

Next, the load balancing unit 304 applies a load balancing function to assign basically any traffic module out of the series of traffic modules 308 to handle the request. The applied load balancing function may be configured to consider the current work load on the individual traffic modules when selecting a suitable one, which however lies outside the scope of the present invention. In this example, the load balancing function happens to select traffic module TM3 for the assignment, and the request is forwarded thereto in a next step 404.

Traffic module TM3 then processes the request involving establishment of session data, some of which may be fetched from a central subscriber database, e.g. the HSS 112 in FIG. 1, which is stored locally in the traffic module TM3. This session data or information may be necessary to use upon further requests, as explained in the background section above.

Thereafter, traffic module TM3 is obliged to send a suitable response back to the requester, in a final step 406, which is typically routed over the S-CSCF node 300 in a suitable manner not necessary to describe here further. In the response, traffic module TM3 adds its own associated port number, which the receiving requester will save for later use. As mentioned above, the port number can be added to the address of the application server in any of the existing so-called "record-route", "via", "route" and "contact" headers that conventionally occur in such responses to service requests.

Figure 5:
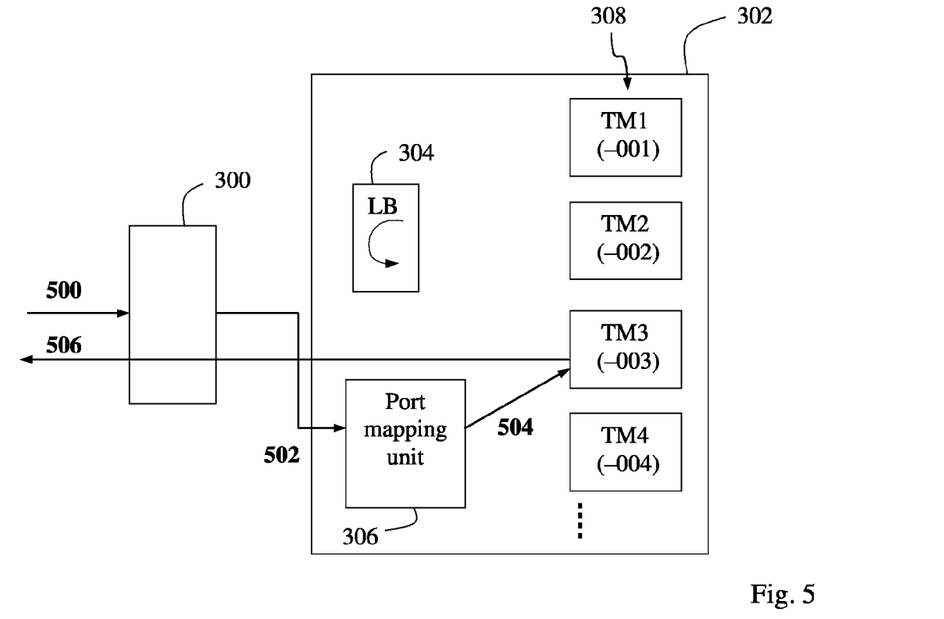
FIG. 5 is a block diagram of the application server in FIG. 3, when receiving a subsequent service request.

FIG. 5 illustrates another traffic case example, following the traffic case example of FIG. 4, when the requester makes a subsequent service request during the same multimedia session. In the previous traffic case, traffic module TM3 was assigned to handle the initial request from this specific requester in this specific session, and should continue to do so upon subsequent requests, readily using the locally stored session data/information. Thus in a first step 500, a subsequent request is received from the requester at the S-CSCF node 300. This time, the request is directed to and received on the port number associated with the assigned traffic module TM3, which the requester had received in the response to the initial request in step 406 above. Thus, receiving the present request on a port number associated with a specific traffic module means that the request is a subsequent request, which is therefore transferred on said port leading to the port mapping unit 306, in a step 502.

The receiving port mapping unit 306 then maps the port number to the internal private network address of the corresponding traffic module, in this case TM3 (−003), and transfers the request thereto in a step 504. Traffic module TM3 then processes the request using the already established and locally stored session data. Finally, as in the traffic case of FIG. 4 above, traffic module TM3 sends a response back to the requester, in a step 506, again with its associated port number preferably included in the record-route header. Alternatively, the port number may be omitted in the response of step 506, since it would be sufficient to include the port number only in the first response message in step 406 to enable the requester to send all subsequent requests to that particular traffic module.

Figure 6:
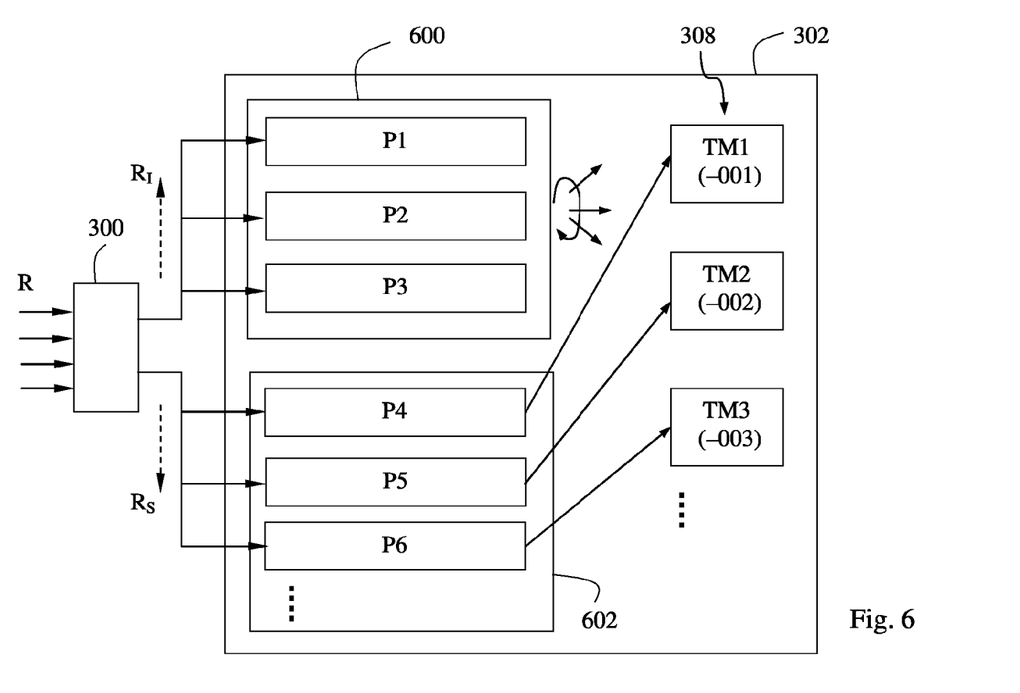
FIG. 6 is a detailed block diagram partially illustrating an application server, according to one embodiment.

FIG. 6 illustrates a preferred embodiment of the application server 302 comprising a number of TCP/UDP input ports P1, P2, P3, P4, P5, P6 . . . , where the first three ports P1-P3 are connected to a load balancing unit 600 and the remaining ports P4, P5, P6 . . . are connected to a port mapping unit 602. As explained above, the S-CSCF node 300 determines which input port at the application server 302 an incoming request is to be transferred to. If the request is detected to be an initial one, $R_I$, it is transferred to one of the three ports P1-P3. On the other hand, if the request is a subsequent one, $R_S$, it is transferred to one of the other ports P4, P5, P6 . . . based on the port number included in the destination address field of the request.

When implementing the present SIP protocol according to 3GPP, a sending requester is obliged to address its service requests to different TCP/UDP input ports in the application server 302, as well as in the S-CSCF node, according to three different main traffic cases, namely: 1) a first port is addressed for originating requests, i.e. when the requesting terminal is the calling terminal, 2) a second port is addressed for terminating requests, i.e. when the requesting terminal is the called terminal, and 3) a third port is addressed for terminating requests, and when the called mobile terminal is known but not registered as an active client in the IMS network. In the latter traffic case, communicated multimedia may still be received by means of call forwarding or the like. In this context, any subsequent requests containing a port number for which the port mapping function can be applied as described above, is considered as a fourth traffic case.

With respect to this given SIP schedule, the application server 302 may be configured in the following way. None of the first three ports P1-P3 is associated with any particular traffic module, and these ports are therefore connected to the load balancing function for assigning basically any one of the traffic modules, since all initial requests will be directed to one of those port numbers P1-P3. On the other hand, each of the remaining ports P4, P5, P6 . . . is associated with a specific traffic module and are therefore connected to the port mapping unit 602, since subsequent requests will be directed to one of those port numbers P4, P5, P6 . . . , after the requester has received a port number associated with the initially assigned traffic module, primarily in the first request response. In the shown example, port number P4 is associated with traffic module TM1, port number P5 is associated with traffic module TM2, port number P6 is associated with traffic module TM3, and so forth.

As is well-known in the art, it may be necessary to retransmit an initial request, if a response thereto has for some reason not been received at the requester. Thus, if the application server receives a retransmitted initial request that has not been answered by the firstly assigned traffic module that received the original request, and another traffic module is assigned for the retransmitted request, a situation may occur when two different traffic modules eventually respond to a request with no coordination. This conflict is safely handled by means of the present solution, since the behaviour of the requester will determine which traffic module will handle further requests of the session in question by addressing subsequent requests to only one of them associated with a given port number. The overlooked traffic module that is not subsequently involved in the session will not be aware of this, but will simply never receive any subsequent requests within that session. The session data stored in the overlooked traffic module for this session will eventually be purged by means of normal operation procedures, e.g. based on a time-out function.

Figure 7:
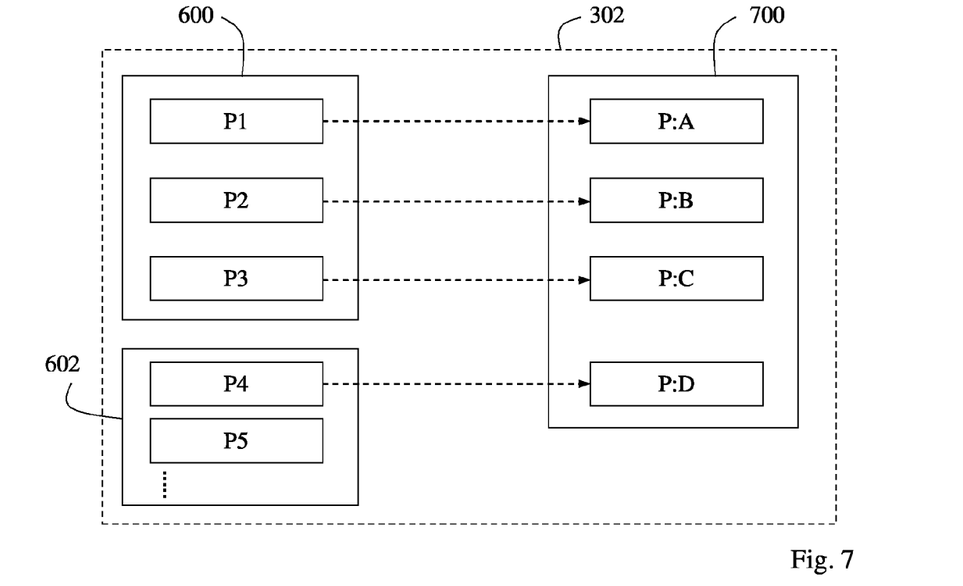
FIG. 7 is a detailed block diagram partially illustrating an application server, according to another embodiment.

FIG. 7 illustrates another embodiment of the application server 302, showing the load balancing unit 600 to which the first three ports P1-P3 are connected, and the port mapping unit 602 to which the remaining ports P4, P5 . . . are connected. In the figure, only one traffic module 700 is shown, itself having basically four input ports P:A, P:B, P:C and P:D, to discern different traffic cases as follows. It should be understood that the other traffic modules in the application server 302 may be configured in a similar manner. In this embodiment, port P:A in the traffic module 700 is configured to receive initial requests according to the first traffic case described above in connection with FIG. 6, i.e. originating requests, on port P1, port P:B is configured to receive initial requests according to the second traffic case, i.e. terminating requests, on port P2, and port P:C is configured to receive initial requests according to the third traffic case, i.e. terminating requests/unregistered, on port P3.

The fourth port P:D in the traffic module 700 is reserved for subsequent requests, according to the fourth traffic case, that the port mapping unit 602 has received on a port number associated with this particular traffic module 700, in this case port P4. Hence, requests received on any of ports P:A-P:C have been subject to the load balancing function, whereas requests received on port P:D have been mapped directly to traffic module 700.

It should be readily understood that any of the load balancing unit 600, the port mapping unit 602 and the traffic module(s) 700, 308 may be modified within the scope of the present invention. For example, the load balancing unit 600 may be connected to only one input port in the traffic module 700 configured to receive any initial requests regardless of traffic case. Further, the port mapping unit 602 may be configured to map one port number to more than one traffic module, or to map more than one port number to one and the same traffic module, etc. Thus, the present invention is not limited to any specific port configuration of the participating parts.

Figure 8:
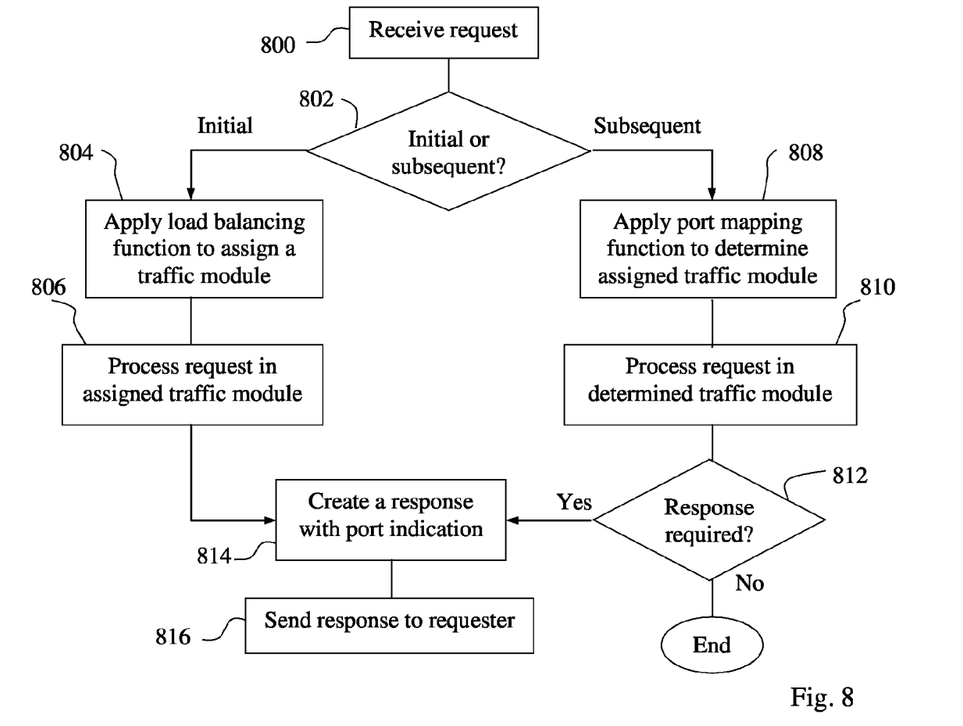
FIG. 8 is a flow chart illustrating a basic procedure for handling a service request, in accordance with the present solution.

Finally, the inventive procedure for handling a service request will now be generally described with reference to a flow chart shown in FIG. 8. The procedural steps shown therein are basically executed by an application server in a multimedia service network comprising a plurality of traffic modules, such as the application server 302 described in connection with FIGS. 3-7. In a first step 800, a service request is generally received from a requester. Typically, the request is received on a specific port in the application server according to the IMS configuration described above, although the present invention is not exclusively limited thereto.

In a next step 802, it is basically determined if the request is an initial or a subsequent one, which is preferably given by means of a port number to which the request is addressed. For example, with reference to the configurations shown in FIGS. 6 and 7 as described above, port numbers 1-3 may indicate an initial request and port numbers 4 and higher may indicate a subsequent request, as described above. If the request is an initial one, a load balancing function capable of selecting basically any traffic module is applied in a step 804, to assign a traffic module for handling the initial request. Then, the request is processed by the assigned traffic module, in a step 806. However, if the request is found to be a subsequent one in step 802, a port mapping function capable of determining a specific already-assigned traffic module, which is associated with a port number given in the request is applied in a step 808, for handling the subsequent request. Then, the request is processed accordingly by the determined traffic module, in a step 810. Then, it may be determined whether the request requires a response or not, in a following step 812. If not, the process may end as indicated.

After processing the initial request in step 806, and also after step 812 if it was determined that a response is required to the received subsequent request, a response is created in a step 814 which includes a specific port number indication associated with the assigned/determined traffic module. This port number is preferably given in an existing header according to the SIP protocol, e.g. "record-route", "via", "route" and "contact". The response is finally sent to the requester in a step 816.

Alternatively, the port indication may be omitted from the response in step 814 if the request was a subsequent one (i.e. after step 812), since the requester presumably then would already know which port number to use from the response given after the first initial request of the session. The subsequent request processed in step 810 may in some cases not require a response at all, as indicated in the "end" block. Naturally, after step 812 or step 816, the process may be repeated when another request is received by returning to the first step 800.

By means of the above-described solution, efficient distribution of the processing load on a cluster of traffic modules within an application server is provided for incoming multimedia service requests. The latency and complexity is also minimised when assigning a traffic module in a scalable application server cluster, and the transmission process is made simple and yet reliable. In particular, if a port number associated with a particular traffic module occurs in a service request, the request is a subsequent one that can easily be conveyed to that traffic module for further processing.

When SIP is used, a particular advantage is that the load balancing and port mapping functions are actually invisible to the SIP application layer, which makes this solution applicable to both TCP and UDP transport. The "via", "route" and "record-route" headers are mandatory header fields but are not used by any application as the basis for invocation of any service logic. Hence, these header fields are never manipulated once they are established, rendering them invisible to SIP applications.

Furthermore, the application server can be configured so that a given port number unambiguously points to the internal private network IP address of a specific traffic module, making this mechanism unaffected by any ongoing reconfiguration of the application server, e.g. when adding or removing traffic modules, or the like. Moreover, conflicts involving more than one responding traffic module in the case of retransmitted requests are safely avoided. For example, the application server can migrate a dialog to a new traffic module, and then reconfigure itself so that the port mapping will point to the new traffic module rather than the old one. In effect, the port mapping function relates to dialog state instances rather than to application logic or even physical servers.

While the invention has been described with reference to specific exemplary embodiments, the description is only intended to illustrate the inventive concept and should not be taken as limiting the scope of the invention. Various alternatives, modifications and equivalents may be used without departing from the spirit of the invention, which is defined by the appended claims.

The invention claimed is:

1. A method of handling incoming service requests in an application server comprising a set of equal traffic modules, each being capable of handling requests for one or more multimedia services implemented in the application server, wherein each traffic module is associated with a specific port number corresponding to an internal private network address of the traffic module, the method comprising the following steps:

receiving an initial service request of a session from a requesting subscriber;

applying a load balancing function capable of selecting basically any traffic module in the set of traffic modules, to assign a traffic module for processing the received initial service request;

sending a response to the initial service request back to the requesting subscriber, said response including the port number associated with the assigned traffic module;

receiving a subsequent service request of the same session from said subscriber including a port number that the subscriber has added to a destination address of the subsequent service request; and applying a port mapping function that maps the port number given in the received subsequent service request to the internal private network address of the previously assigned traffic module, for processing the received subsequent service request.

2. The method according to claim 1, wherein the application server belongs to an IMS service network and the service requests are communicated according to the SIP protocol.

3. The method according to claim 2, wherein the port number of the assigned traffic module is provided in said response to the initial service request by adding said port number to the address of the application server in one of the following existing SIP headers: "record-route", "via", "route" and "contact".

4. The method according to claim 1, wherein incoming service requests are received on different input ports at the application server.

5. The method according to claim 4, wherein the application server applies either the load balancing function or the port mapping function, based on which port number a request is received on at the application server.

6. The method according to claim 5, wherein the application server applies the load balancing function when initial requests are received on at least one predetermined port number at the application server.

7. The method according to claim 6, wherein initial requests according to a first traffic case of originating requests are received on a first predetermined port number, initial requests according to a second traffic case of terminating requests are received on a second predetermined port number, and initial requests according to a third traffic case of terminating requests/unregistered are received on a third predetermined port number.

8. The method according to claim 7, wherein the application server applies the port mapping function when subsequent requests according to a fourth traffic case are received on a fourth predetermined port number or higher.

9. The method according to claim 4, wherein incoming service requests are provided on different input ports at the assigned traffic module, based on which port numbers the application server receives the requests on, to discern different traffic cases.

10. The method according to claim 7 wherein:

initial requests, received on the first predetermined port number at the application server, are provided on a first input port at the assigned traffic module;

initial requests, received on the second predetermined port number at the application server, are provided on a second input port at the assigned traffic module;

initial requests, received on the third predetermined port number at the application server, are provided on a third input port at the assigned traffic module; and subsequent requests, received on the fourth predetermined port number or higher at the application server, are provided on a fourth input port at the assigned traffic module.

11. An apparatus comprising an application server for handling incoming service requests, the application server comprising:

a set of equal traffic modules, each being capable of executing the handling of requests for one or more multimedia services implemented in the application server, wherein each traffic module is associated with a specific port number corresponding to an internal private network address of the traffic module;

a receiving unit adapted to execute receiving an initial service request of a session from a requesting subscriber;

a load balancing unit adapted to execute applying a load balancing function capable of selecting basically any traffic module in the set of traffic modules to assign a traffic module for processing the received initial service request;

a sending unit adapted to execute sending a response to the initial service request back to the requesting subscriber, said response including the port number associated with the assigned traffic module; and a port mapping unit adapted to execute applying a port mapping function that maps the port number given in the received subsequent service request to the internal private network address of the previously assigned traffic module, for processing the received subsequent service request.

12. The apparatus according to claim 11, wherein the application server belongs to an IMS service network and the service requests are communicated according to the SIP protocol.

13. The apparatus according to claim 12, wherein said sending unit is adapted to provide the port number of the assigned traffic module by adding it to the address of the application server in one of the following existing SIP headers: "record-route", "via", "route" and "contact".

14. The apparatus according to claim 11, wherein the application server is adapted to receive incoming service requests on different input ports.

15. The apparatus according to claim 14, wherein the application server is adapted to apply either the load balancing function or the port mapping function, based on which port number a request is received on.

16. The apparatus according to claim 15, wherein the application server is adapted to apply the load balancing function when initial requests are received on at least one predetermined port number.

17. The apparatus according to claim 16, wherein the application server is adapted to receive initial requests according to a first traffic case of originating requests on a first predetermined port number, receive initial requests according to a second traffic case of terminating requests on a second predetermined port number, and receive initial requests according to a third traffic case of terminating requests/unregistered on a third predetermined port number.

18. The apparatus according to claim 17, wherein the application server is adapted to apply the port mapping function when subsequent requests according to a fourth traffic case are received on a fourth predetermined port number or higher.

19. The apparatus according to claim 14, wherein the application server is adapted to provide incoming service requests on different input ports at the assigned traffic module, based on which port numbers the requests are received on, to discern different traffic cases.

20. The apparatus according to claim 17, wherein the application server is adapted to:
provide initial requests, received on the first predetermined port number, on a first input port at the assigned traffic module;
provide initial requests, received on the second predetermined port number, on a second input port at the assigned traffic module;
provide initial requests, received on the third predetermined port number, on a third input port at the assigned traffic module; and
provide subsequent requests, received on the fourth predetermined port number or higher, on a fourth input port at the assigned traffic module.

* * * * *